Feb. 17, 1959     D. E. MORRIS     2,874,259
ICE DETECTOR AND CONTROL SYSTEM
Filed April 6, 1956                             4 Sheets-Sheet 1

INVENTOR.
Donald E. Morris
BY Craig V. Morton
HIS ATTORNEY

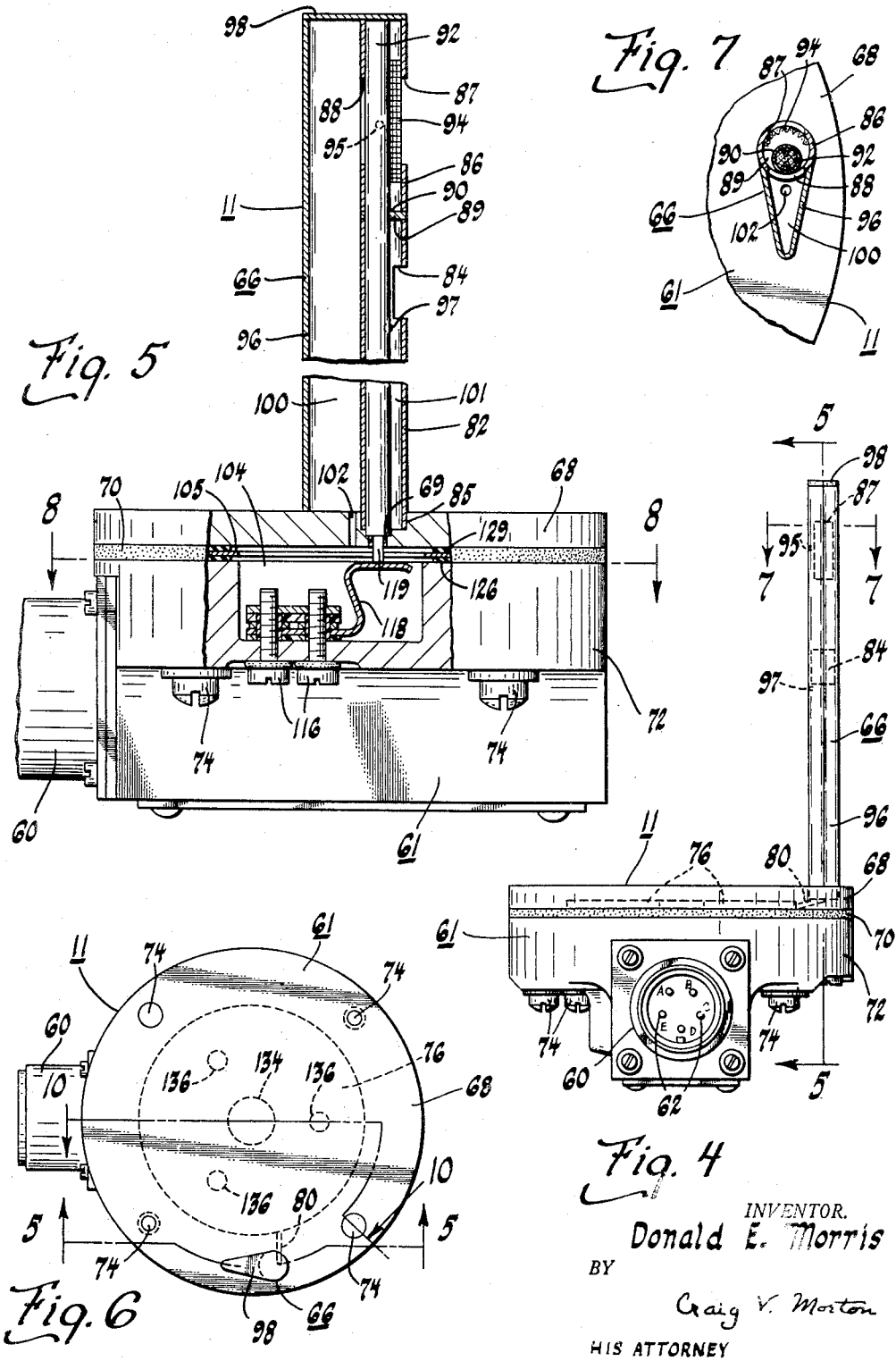

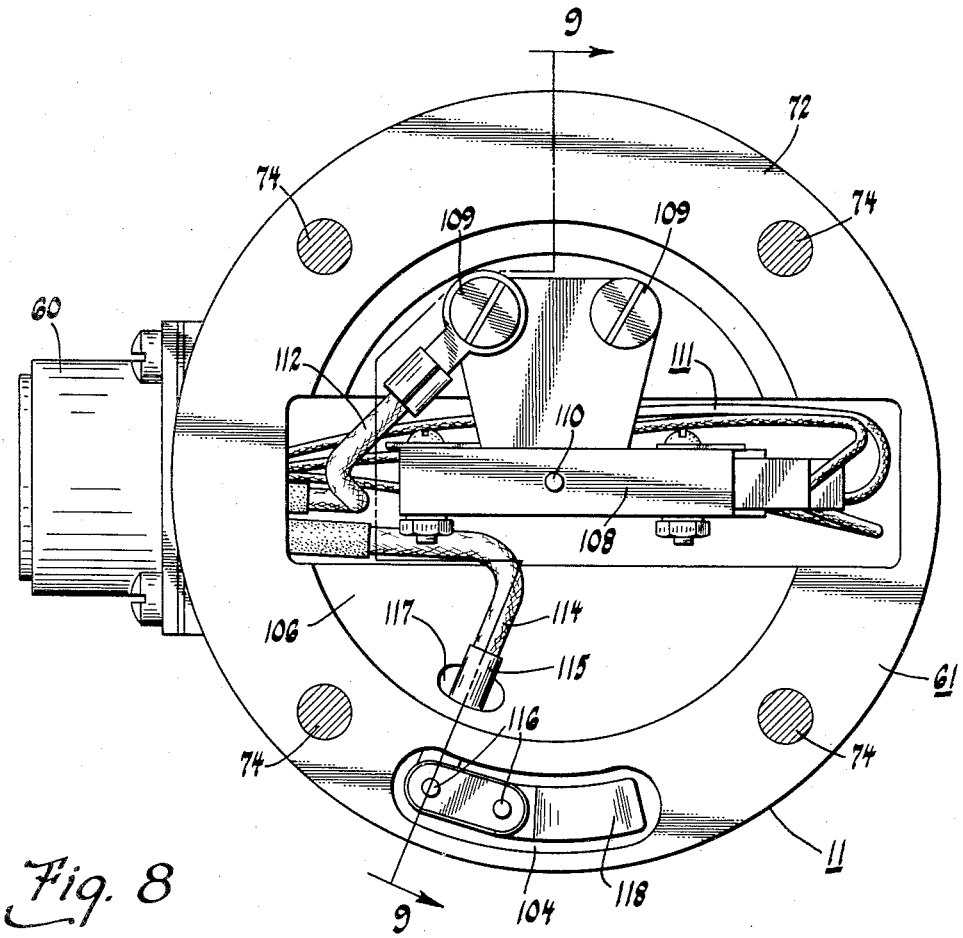

Feb. 17, 1959 D. E. MORRIS 2,874,259
ICE DETECTOR AND CONTROL SYSTEM
Filed April 6, 1956 4 Sheets-Sheet 4

INVENTOR.
Donald E. Morris
BY
Craig V. Morton
HIS ATTORNEY

United States Patent Office 2,874,259
Patented Feb. 17, 1959

2,874,259

ICE DETECTOR AND CONTROL SYSTEM

Donald E. Morris, Dayton, Ohio, assignor to General Motors Corporation, Detroit, Mich., a corporation of Delaware Application April 6, 1956, Serial No. 576,716

8 Claims. (Cl. 219—19)

This invention relates to a rapid-sensing ice detection means for aircraft and particularly to a two positive pressure device in a system responsive to loss of one positive pressure for removal of any ice that has accumulated.

Various means for detecting icing conditions are known to the aircraft industry, but require a protective thermal cutout for the ice-removal heating means operable therewith. The importance of this factor becomes even more pronounced when a higher wattage is needed in melting accumulated ice.

An object of this invention is to provide a small, lightweight ice detecting means, the operation of which is based on two positive pressures.

Another object is to provide an ice detector having two separate openings in a leading edge of a probe protruding into an air stream in which one opening is a large uncovered hole and the other opening is capable of icing over from atmospheric weather conditions.

Another object is to provide a control system with ice detecting means eliminating protective thermal cutouts for required higher-wattage in manual, semi-manual or automatic operation of heating units for deicing of aircraft engines and/or air frame surfaces.

Another object is to provide an ice detector having a diaphragm subject to normally balanced pressures on opposite sides thereof with bleed, or vent, holes on each side to maintain pressure balance under normal conditions at high air speeds and to prevent bridging of probe openings by water at low air speeds.

Further objects and advantages of the present invention will be apparent from the following description, reference being had to the accompanying drawings wherein a preferred embodiment of the present invention is clearly shown.

In the drawings:

Figure 4 shows a rear-end elevational view of a preferred embodiment of an ice detector in the present invention.

Figure 5 is a side elevational view partially cross-sectioned along line 5—5 of Figure 4 and Figure 6 to show the assembly structure of an ice detecting probe in the present invention including an electrical contact for a heating element with a screened aperture thereof.

Figure 6 is a plan view of the ice detector of Figures 4 and 5 showing the curvature of line 5—5 to obtain the cross-sectional elevational view of the heating element contact of Figure 5.

Figure 7 is a cross-sectional plan view of the probe taken along line 7—7 of Figure 4.

Figure 8 is a plan view of the detector base assembly along line 8—8 of Figure 5.

Figure 1:
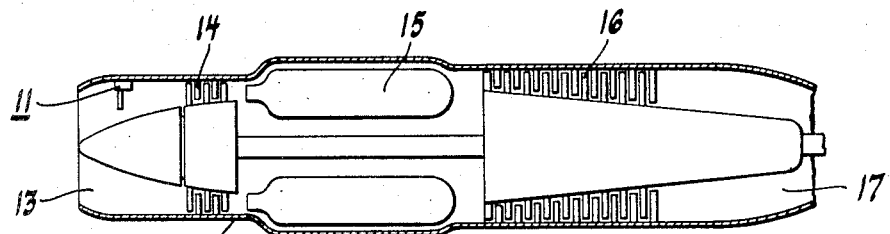
Figure 1 shows an ice detecting means of the present invention disposed in an air stream at the intake of an aircraft engine.

The aforementioned and other objects are accomplished in a preferred embodiment of the present invention by an ice detecting means capable of being mounted in an air stream comprising an ice detector assembly including a case, or housing, having a probe base or top plate with a pocket-forming recess portion on one side thereof. The probe base has a plurality of passages therein communicating with ports formed by a partitioned air intake means or probe suitably attached thereto as by silver brazing. The probe is assembled having a pair of axially spaced cylindrical members separated by an off-center apertured disc. The two cylindrical members provide two separate longitudinally spaced openings in the leading edge of the probe as mounted in the air stream. One opening is a large uncovered hole while the other opening is provided with restricting means, that is, it is covered with a fine-mesh screen, or is formed by drilling a plurality of small holes in a cluster. Diametrically opposite the one aperture in one cylindrical member is another opening or aperture leading to a port passage formed along the trailing edge of the cylindrical members and discs by a substantially V-shaped trailing-edge airfoil portion, attached as by brazing longitudinally along opposite sides of the assembled cylindrical members. A teardrop-shaped disc or airfoil cover seals off the free end of the probe assembly so that all air entering through the one opening is ported through the probe base assembly to one side of a diaphragm.

A heating element, unit, or ice removal heating means, is fitted longitudinally inside the cylindrical members through the aperture of the disc between the members and is sealed in an aperture of the base plate with suitable means such as a plastic seal or saureisen cement. An electrical contact from the heating means is left protruding from the base assembly on the side opposite the probe assembly. The heating means is used to locally heat the screen mesh in operation of the ice detector as explained in further detail below.

The uncovered opening of the probe assembly communicates with port passages in the base plate to apply airstream total pressure to the opposite side of the diaphragm enclosed by a cover assembly. The cover assembly is attached to the probe base assembly with the diaphragm therebetween by cap screws suitably threaded into a plurality of aligned apertures in each of these parts so that two positive pressures can be applied on opposite sides of the diaphragm. The cover assembly also houses a snap action switch which, when actuated by movement of the diaphragm upon loss of pressure upon one side, energizes a relay which energizes the heating means.

Two bleed holes, or vents, are also provided for proper ice detecting operation. A bleed hole on the screen side of the diaphragm is necessary to prevent bridging of the screen by water at low air speeds. A bleed hole, or vent, on the other side of the diaphragm is required to maintain the pressure balance under normal conditions at high air speeds. As long as the air pressure is balanced, the diaphragm will not move; this is true on the ground with 0 p. s. i. on both sides or, for example, at 630 miles per hour, with 7.2 p. s. i. on both sides.

In operation, the ice detecting means of the present invention is based on maintaining two positive pressures on the diaphragm through the probe passages. Normally, the pressure is balanced and the diaphragm will not move. However, if icing conditions occur during engine operation, the fine mesh screen, or small holes, will ice over rapidly causing a loss of pressure on one side of the diaphragm. The loss of one pressure on one side permits the second pressure on the other side of the diaphragm to move the diaphragm which actuates a snap-action switch. The switch energizes a relay in a circuit which energizes a heating means. This heating means may be the heating unit in the probe only, or it may automatically include arming relay means and heating units for deicing aircraft components depending upon the electrical circuit connection desired. The relay may also only energize an indicating lamp for the pilot who must then manually actuate switching means to energize the heating means including units or elements to melt accumulated ice from surfaces where it is dangerous and undesired.

The heating unit, or element, mounted in the ice detector probe melts ice from the screen plus any ice that has accumulated around the large uncovered, or unrestricted, opening. As soon as the ice melts, the pressure returns to the screen side of the diaphragm returning the diaphragm to its original position so as to reset the snap-action switch. The balanced two positive pressures are once again applied to opposite sides of the diaphragm. Re-setting the snap-action switch deenergizes the relay which removes the power from the heating means. The ice detector and control system is now ready to sense any further icing conditions.

With particular reference to Figure 1, an ice detector, generally indicated by the numeral 11, is shown mounted in the air intake of a jet engine, generally indicated by the numeral 12. The air intake 13 is located in the forward portion of the engine 12 and provides a supply of air to the compressor 14 and then to the combustion chambers 15 where the compressed air is mixed with fuel and burned to escape at a high temperature to drive a multi-stage turbine 16 ultimately leaving the engine through an exhaust portion 17 of the engine. The ice detector 11 is preferably mounted in a depending position as shown in the example of Figure 1 so that water and ice removed therefrom can drain off easily. The device may also be used with turbo-prop and reciprocating piston engines for detecting impending icing conditions quickly and accurately for relaying signals to the pilot and/or ice removal heating means actuated thereby.

Figure 2:
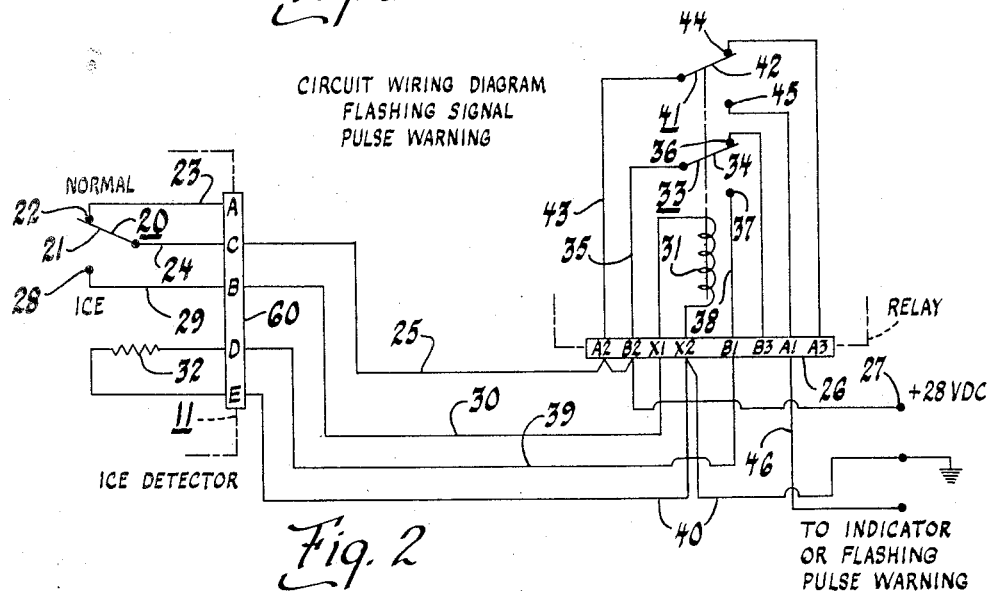
Figure 2 shows the wiring diagram of an electric circuit including an ice detecting means as in Figure 1 operably disposed therewith for providing pulses or flash signals indicating icing conditions.

Figure 2 shows a wiring diagram of an electric circuit including a relay and ice detector having a switch, generally indicated by the numeral 20, which is actuated within the ice detecting means 11 in a manner to be described below. The switch 20 is disposed with the ice detector having a "normal" and "ice" position as labeled in the diagram of Figure 2. The normal, or open, circuit position connects a movable contact 21 with a fixed contact 22 and a wire, or lead, 23 which is connected to a terminal or prong marked A on a terminal block, or electric socket, plug 60. The movable contact 21 is connected by a wire 24 to a terminal C of the block 60, which, in turn, is connected through a wire 25 to terminals A2 and B2 of a relay terminal block 26, and also to a terminal 27 where, for example, a 28 volt D. C. battery, or power source, not shown, may be connected. Thus, the movable contact 21 can serve to energize a circuit whenever the ice detector 11 causes actuation of the switch 20 in a manner such that the movable contact 21 is caused to engage a fixed contact 28 labeled in Figure 2 as the "ice" position. The contact 28 is connected through a wire 29 to a terminal B of the block 60, which, in turn, is connected by a wire, or lead, 30 to a terminal marked X1 on the relay terminal block 26. The relay block 26 also is provided with a terminal marked X2 and a solenoid, or relay winding, 31 is connected across the terminals X1 and X2.

A heating element, or means, 32 for deicing the ice detector is connected across a terminal E and a terminal D of the plug 60. The circuit through the heating element 32 is completed through a first switch portion, generally indicated by the numeral 33, of the relay. A movable contact 34 of the switch 33 is connected by a wire 35 to battery terminal B2 of the relay block 26. The movable contact 34 is normally engaged with a fixed contact 36 representing an open circuit connection with terminal B3 of the relay terminal block 26. When coil 31 is energized, the movable contact 34 of switch 33 is engageable with a fixed contact 37 completing a power supply connection to heating element 32 by way of a wire 38 connecting contact 37 to terminal B1 of relay block 26 and a lead 39 between terminal B1 of the relay and terminal D of the ice detector. A wire 40 connects terminal E of the ice detector and terminal X2 of the relay to ground as indicated schematically.

The solenoid 31 also actuates a second switch, generally indicated by the numeral 41, of the relay simultaneously with the first switch 33. A movable contact 42 of the switch 41 is conected by a wire 43 to the battery connected terminal A2 of relay block 26. The movable contact 42 of switch 41 is normally engaged with a fixed contact 44 representing an open circuit connection with terminal A3 of the relay terminal block 26. When coil 31 is energized, the movable contact 42 of switch 41 is engageable with a fixed contact 45 connected to terminal A1 of relay block 26. The terminal A1 is connected by a wiring 46 to an indicator, or a flasher-pulse, warning device for the pilot of an aircraft in which the ice detector and circuit are installed. The pilot must then manually actuate aircraft deicing means other than the ice detector heating element 32. The flasher, or indicator, repeats the pilot warning if icing continues to recycle the movement of switch 20 in the ice detector. A warning of the severity of icing conditions is relayed to the pilot by repetition of circuit energization through repeated movement of the ice detector switch 20 between "normal" and "ice" positioning.

Briefly outlining the operation of the circuit shown diagrammatically in Figure 2, the ice detector 11 becomes covered with ice and causes the contact 21 of switch 20 in the ice detector to move from its normally open position with fixed contact 22 to a closed circuit "ice" position engaging the fixed contact 28. This closes the circuit through the wiring as described and energizes the solenoid 31, together with the heating element 32 of the ice detector, because the solenoid closes the switch 33 by shifting the movable contact 34 from its open position with contact 36 to a closed circuit position with fixed contact 37 connecting the heating element 32 through the lead 38, terminal B1, and wire 39 to terminal D of the ice detecting means. The heating element 32 completes the circuit to ground through terminal E and the wire 40 by way of the X2 terminal of the relay terminal block 26, as indicated in Figure 2. The relay also serves to connect a warning, or indicator, flashing device for the pilot to show the severity of icing conditions by closing the switch 41 simultaneously with the closing of switch 33 due to energization of the solenoid 31. The indicator, or flasher, warning signal device may be mounted in the pilot's cockpit and is not shown in the circuit diagram of Figure 2.

Figure 3:
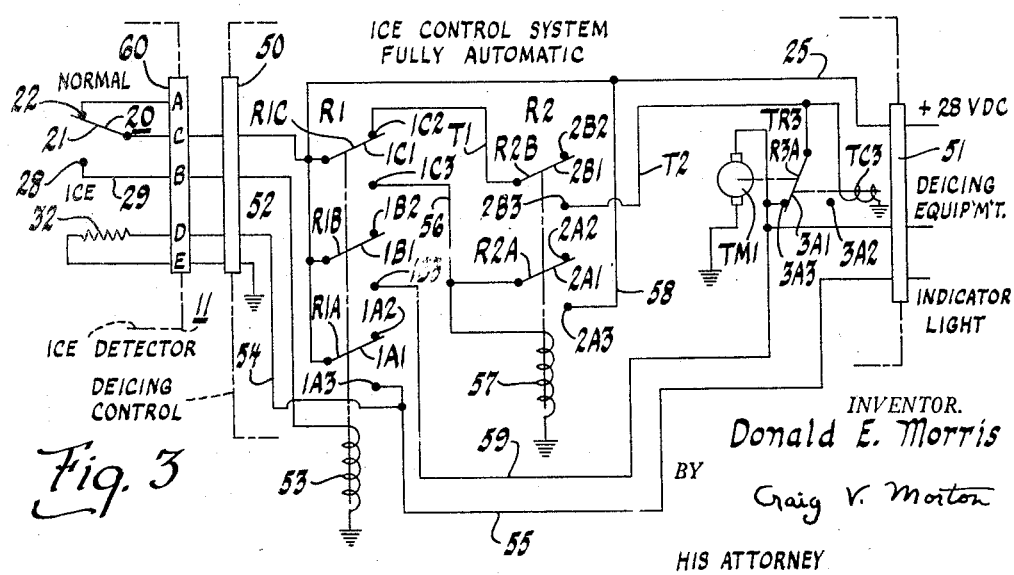
Figure 3 shows an electrical ice detecting system fully automatic in operation with a circuit-energizing ice detector switching means having probe and aircraft component heating means actuated in response to icing-caused loss of one positive pressure on a diaphragm of the detector operatively based on balancing of two positive pressures.

Figure 3 shows an electric ice detecting system, fully automatic in operation, with a circuit energizing both probe and aircraft component heating means in response to icing-caused closing of an ice detector switching means 20. The wiring and contacts in the fully automatic control ssytem of Figure 3, which are comparable to the contacts and wiring in the circuit wiring diagram for the flashing-signal indicator of Figure 2 are designated in Figure 3 with the same numbers used in Figure 2. Thus, the terminal C of the block 60 on the ice detector is connected through a wire 25 to a source of power, such as a 28 volt D. C. battery, as shown in Figure 3. Figure 3 shows a deicing control portion of the ice control system indicated by the broken lines through terminal blocks 50 and 51 of the deicing control. Closing the contacts 21 and 28 in the ice detector completes a circuit through the terminals C and B of the ice detector from the battery wire 25 in the deicing control to a wire 52 and a solenoid 53 to ground. Energization of the solenoid 53 closes a relay R1 having triple switching means R1A, R1B and R1C. The switch R1A has a movable contact 1A1, which is normally in an open circuit position engaging the contact 1A2. Energization of the solenoid 53 closes the movable contact 1A1 against the fixed contact 1A3 connecting the heating element 32 of the ice detector through a wire 54 and terminals D and E of the ice detector terminal block 60 to ground. Energization of the heating element 32 of the ice detector begins melting the ice which initially caused closing of the switch 20 in the ice detector. At the same time that the heating element 32 is energized by closing of the contacts 1A1 and 1A3 of the relay switch R1A, a circuit is completed through a wire 55 by way of terminal block 51 of the deicing control to an indicator light or warning device (not shown) in the pilot's cockpit.

In the automatic control system of Figure 3 there is also an arming relay R2, which is provided for the following purpose in the operation of the ice detector and automatic ice control system. The relay R2 includes two relay switch arms generally indicated by the numerals R2A and R2B. The relay R2 is in a normally open position as indicated diagrammatically in Figure 3 and after the initial icing has occurred in the ice detector 11 to close the switch 20 energizing the circuit as described, the relay R2 remains energized until the master switch of the aircraft is turned off upon completion of the flight. The relay R2 becomes armed when the switch generally indicated by the designation R1C of relay R1 is connected simultaneously with movement of the switch R1A to cause contact between the movable contact 1C1 of the switch R1C into engagement with the fixed contact 1C3. This completes the circuit from the battery-connected wire 25 through a wire 56 to a solenoid 57 to ground. Energization of solenoid 57 causes the switches R2A and R2B of relay R2 to be moved downwardly in the diagrammatic representation of Figure 3. The circuit through the solenoid 57 is completed from the battery to ground as indicated. Moving the switches of relay R2 to the position corresponding to movement of the relay upon energization of solenoid 57 closes an added battery circuit through movable contact 2A1 and fixed contact 2A3 from wire 58 connected with wire 25 to the power source or battery as shown in the circuit diagram. Thus, once the relay R1 has closed the contacts 1C1 and 1C3, the arming relay R2 remains energized until the flight is completed as described above, because contacts 2A1 and 2A3 remain closed supplying power to the solenoid 57 from the battery through wires 25 and 58 as described.

The automatic control system of Figure 3 not only actuates and energizes the heating element 32 and indicator light through the switch R1A, but also energizes other aircraft deicing equipment. This other aircraft deicing equipment may include heating means disposed with the aircraft engine or air frame surfaces, which are energized through the wire 25 connected with the battery by means of the relay switch R1B, simultaneously with the closing of relay switches R1A and R1C. The movable contact 1B1 of relay switch R1B is moved into engagement with fixed contact 1B3 closing the circuit to the deicing equipment through a wire 59. The deicing equipment may be connected to the terminal block 51 of the deicing control, as shown. With the heating element 32 and deicing equipment energized, the ice will be melted from the iced-over portions until the ice detector is free of ice, so that the switch 20 thereof returns the movable contact 21 to the open-circuit position with contact 22.

As soon as switch 20 of Figure 3 is opened, the circuit through wire 52 to the coil 53 of relay R1 is broken and the switches R1A, R1B and R1C return to their normally open position shown in the diagram of Figure 3. In this normally open position of relay R1, the contacts 1A1 and 1A2 of switch R1A are closed, and simultaneously contacts 1B1 and 1B2 are closed connecting both switches R1A and R1B in the open-circuit position. With switches R1A and R1B in the open circuit position, the indicator light and also the heating element 32 of the ice detector are deenergized. However, the deicing equipment remains energized through a time delay portion of the deicing control. When the solenoid 53 is deenergized, the contact 1C1 of switch R1C in relay R1 closes upon a fixed contact 1C2, which is connected through a wire T1 to the switch R2B of the arming relay R2. Due to the fact that the arming relay, once energized by an icing cycle, closes the circuit through the solenoid 57 by way of the switch R2A and wiring 58 and 25, the switch R2B is in a downward position corresponding to the downward position of switch R2A, and completes a circuit through the movable contact 2B1 and fixed contact 2B3 through a wire T2 to a time delay relay included in the deicing control.

The time delay relay portion of the deicing control includes a time delay relay TR3 having a switch R3A in a normally closed position connecting movable contact 3A1 with fixed contact 3A3 connecting the deicing equipment with the battery source as shown in the circuit diagram of Figure 3. The time delay relay also normally completes a circuit to an electric timing motor TM1, which drives a mechanical cam gear mechanism (not shown) of a conventional timing mechanism for a predetermined length of time until the movable contact 3A1 is shifted by a snap-acting mechanism actuated by the cam gear mechanism to a fixed contact 3A2 representing an open circuit position deenergizing and breaking the circuit of the motor TM1 and deicing equipment. The time delay effected by operation of the motor TM1 may be for any suitable period of time desired for continued operation of heating means to effect melting away of ice. For example, current may continue to flow for two minutes to the deicing equipment through the switch R1C of relay R1 and contacts 2B1 and 2B3 of switch R2B of relay R2 and through contacts 3A1 and 3A3 of the time delay relay TR3 after the switch 20 of the ice detector has returned to its open position with engagement of contacts 21 and 22, causing relay R1 to revert to its normally biased position shown in Figure 3 with the solenoid 53 deenergized. This time delay assures completes deicing of the aircraft components served by the deicing equipment connected to the terminal block 51 of the deicing control.

In the time delay portion of the deicing control of Figure 3, there is also a clutch coil or solenoid TC3, which is operably connected to the time delay relay TR3 as indicated by the broken line to maintain the switch R3A in the position closing movable contact 3A1 upon the fixed contact 3A2 for open circuit connection deenergizing the deicing equipment and stopping the operation of the cam driving motor TM1. The solenoid TC3 remains energized by a connection through the wiring 25 and contacts 1C1 and 1C2 of switch R1C of relay R1 and through wire T1 and contacts 2B1 and 2B3 of switch R2B of arming relay R2 and wire T2. However, the solenoid TC3 of the time delay relay portion of the deicing control is deenergized as soon as the ice detector becomes iced over by a repeated accretion of ice thereon, because the closing of contacts 21 and 28 of the ice detector will again energize the solenoid 53 to move the three switches R1A, R1B and R1C, of relay R1, to a position connecting the contacts 1A1 and 1A3, 1B1 and 1B3, as well as contacts 1C1 and 1C3 for a recycling operation of the automatic ice control system energizing the heating element 32, indicator light and deicing equipment as described above. As soon as the switch R1C of relay R1 is moved, closing the circuit with contacts 1C1 and 1C3, current flow through the time delay solenoid TC3 is interrupted because contacts 1C1 and 1C2 of switch R1C are separated. As soon as the current stops flowing in the solenoid TC3 in the time delay portion of the deicing control, the switch R3A of the time delay relay TR3 returns to its normally closed position with engagement of contacts 3A1 and 3A3. As soon as the contacts 3A1 and 3A3 complete the circuit to the time delay motor TM1 and the deicing equipment connected to terminal block 51, the time delay portion of the deicing control is reset for renewed operation as described above. Whenever the switching means 20 of the ice detector is returned to an open circuit position due to melting away of the ice accumulated on the ice detector, then the circuit to the solenoid 53 of relay R1 is again deenergized and the switch R1C returns to its normal biased position, closing contacts 1C1 and 1C2 once again completing the power delivery to the time delay portion of the deicing control through the switch R2B of the relay R2, permitting the motor TM1 to drive the cam mechanism until the switch R3A of the delay relay TR3 is snapped to an open circuit position as described above.

The automatic ice control system of Figure 3 remains armed for operation through the arming relay R2 as long as the master switch of the aircraft remains actuated and only after completion of the flight, when the master switch is turned off, is the circuit through the solenoid 57 of arming relay R2 broken, permitting the contacts 2A1 and 2B1 to return to an open circuit position with contacts 2A2 and 2B2, respectively, as shown in the diagrammatic representation of the control system in Figure 3.

Figure 4 is a rear-end elevational view of the subject two-positive pressure ice detecting means 11 showing an electrical socket plug 60 and a case, or housing, generally indicated by the numeral 61. Multiple prongs 62 are shown for connection as outlined above, represented by terminals A, B, C, D and E in the circuits of Figures 2 and 3. A probe 66 having a trailing edge is shown vertically mounted at one side of a base plate or probe mounting assembly 68 of case 61. A diaphragm 70 is disposed between the base plate 68 and a cover member 72 of case 61 by assembly or cap screws 74. Figure 4 shows a dotted outline of pocket-forming recesses 76 connected by an opening, or passage, 80 to a space formed with the probe 66 by an assembly shown in further detail in Figure 5.

Figure 11:
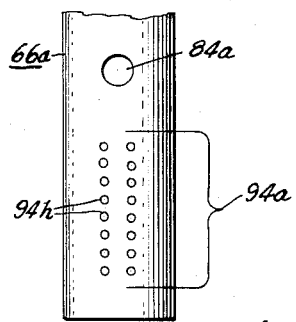
Figure 11 is a fragmentary view of an ice detecting probe in accordance with the present invention and having holes in a cluster.

Figure 5 shows a cross-sectional elevational view of the probe 66 in assembled relationship, comprising, a first cylindrical member 82 apertured in a leading edge by an opening 84. The member 82 is attached to a recess 85 of the probe base 68 by a suitable sealing means or cement such as saureisen 69. Mounted longitudinally of and coaxially with the first cylindrical member 82 is a second cylindrical member 86, apertured at 87 in a forward edge thereof and apertured at 88 in a rear edge thereof diametrically opposite aperture 87. Aperture 87 represents the intake for air which provides one positive pressure and aperture 84 is the intake for air providing the second positive pressure. A disc 89 is cemented or attached between members 82 and 86 having an off-center aperture 90 through which a heating element or ice removal heating means 92 is fitted in an axis paralleling the cylindrical members 82 and 86. The heating means 92 corresponds to element 32 of Figures 2 and 3. An aperture restricting means or screen 94 is suitably attached to the cylindrical member 86 covering the forward aperture 87 of the probe 66 for a purpose in the operation of the subject ice detector to be described later. A plurality of small holes 94h drilled in a cluster 94a in a probe 66a also having an aperture 84a shown in a fragmentary view of Fig. 11 may be provided in place of screen 94 with aperture 87. A small bleed hole or vent aperture 95 is drilled through the lateral wall of cylindrical member 86 behind and to the side of aperture 87 and screen 94 at right angles thereto. Bleed hole 95 is drilled inwardly toward the vertical axis of the ice detecting means 11 and is necessary in the screen side of the diaphragm 70 to prevent bridging of the screen 94 of probe 66 or of a cluster 94a of holes 94h of probe 66a by water at low air speeds.

The probe 66, as shown in Figure 5, also includes a trailing edge member, V-shaped, or trailing airfoil portion 96 and a teardrop-shaped cap or cover 98 sealing off the top of the probe 66 forming a passage through the aperture 87 and screen 94 around the heating element 92 through aperture or opening 88 to space, or passageway, 100 formed between the member 96 and the rear edges of cylindrical member 86, disc 89 and cylindrical member 82. A bore, or aperture, 102 is provided in the base plate 68 connecting the passage 100 to a space 104 through an opening, or aperture, 105 formed in the diaphragm 70 at one side thereof in alignment with the mounting location of the probe 66 on the base plate 68. The heating unit 92 is provided in sealing engagement with the aperture 90 of disc 89 to separate the first positive-pressure passage 100 from a second positive-pressure passage 101 formed in the cylindrical member 82 through aperture 84 communicating with the pocket forming recesses 76 on one side of diaphragm 70 in the base plate 68 through the aperture 80 mentioned with Figure 4. A small bleed hole, or vent, aperture 97 is drilled in cylindrical member 82 in a manner and direction similar to bleed hole 95 in cylindrical member 86. The bleed hole 97 is adjacent aperture 84 and is required to maintain the pressure balance under normal conditions at high air speeds. Bleed hole 97 is partially visible in Figure 5 behind heating element 92 which melts ice from the screen 94 plus any ice that has accumulated around opening, or aperture, 84 of cylindrical member 82.

Figure 6 shows a plan or top view of the passage 80 connecting from the space inside the cylindrical member 82 of probe 66 with the recess 76.

Figure 7 is a cross-sectional view taken along line 7—7 of Figure 4 showing the assembly of the second cylindrical member 86 with the V-shaped member 96 forming a leading and trailing edge of the probe 66, respectively. The cross-sectional view clearly shows the path provided as an air intake through aperture 87 and screen 94 attached to the cylindrical member 86. Air representing one positive pressure passes through rear aperture 88 into passageway 100 leading to aperture 102 in the base 68 as described above. The heating element 92 is shown disposed so that air may flow around either side thereof through aperture 88. The disc 89 is seen from a top view with its off-center aperture 90 for the heating element 92.

Figure 9:
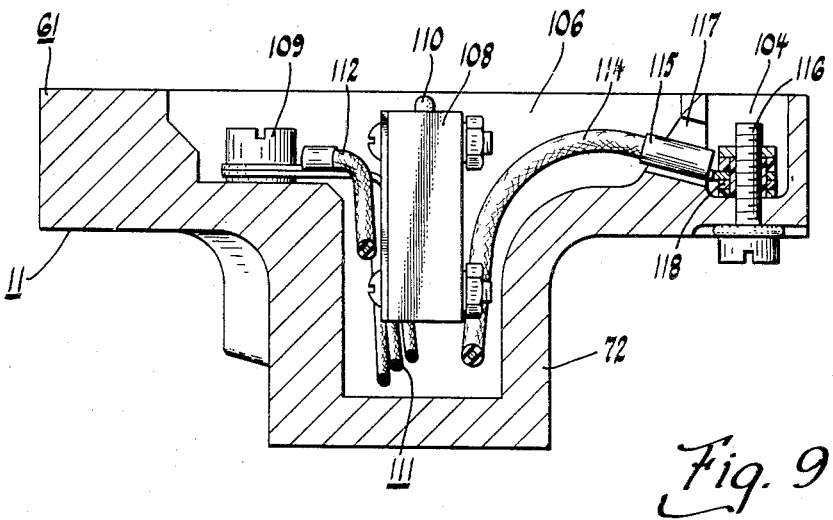
Figure 9 is a cross-sectional elevational view of the detector base assembly along line 9—9 of Figure 8.

Figure 8 is a cross-sectional view looking down at the top of the cover member 72 as indicated in Figure 5. The cover member 72 provides an air-pocket-forming recess 106 for one positive air pressure in which a conventional normally open snap-acting switching means 108 is mounted by screws 109. Switching means or switch 108 corresponds to the ice detector switch 20 in the circuits of Figures 2 and 3. The switch 108 has an actuating plunger or prong 110 also shown in Figure 9 in a view taken along a cross-sectional line 9—9 of Figure 8. Figure 9 shows an end view of the switch 108 with the plunger 110 together with the wiring generally indicated by the numeral 111 electrically interconnecting the switch contacts (not shown) inside the conventional relay switch 108. The wiring generally indicated by the numeral 111 and the switch contacts are shown and described specifically with Figures 2 and 3. One wire 112 may be connected to a prong 62 of the electrical socket plug 60 at one end and may be grounded at its other end by mounting screw 109 to the cover plate 72 providing an ice removal heating means connection as described in the circuits of Figures 2 and 3 including a source of energy or battery. Another wire 114 is connected from one of the plug prongs (D in Figures 2 and 3) to a terminal assembly inside the ice detector 11 for connecting heating means 92 with the battery. The terminal assembly includes a spring contact arm 118 shown in Figures 5, 8 and 9. The wire 114 is provided with a terminal 115 secured to the terminal assembly spring arm 118 with screws 116 and passes through an aperture 117 between the airpocket-forming chamber 104 housing the terminal assembly to the one positive-pressure air chamber recess 106 in which the switch 108 is operatively located with the recess-forming structural portion of cover plate 72 and the diaphragm 70. The terminal assembly spring arm 118 engages an electrical connection or rod 119 of the heating unit 92.

Figure 10:
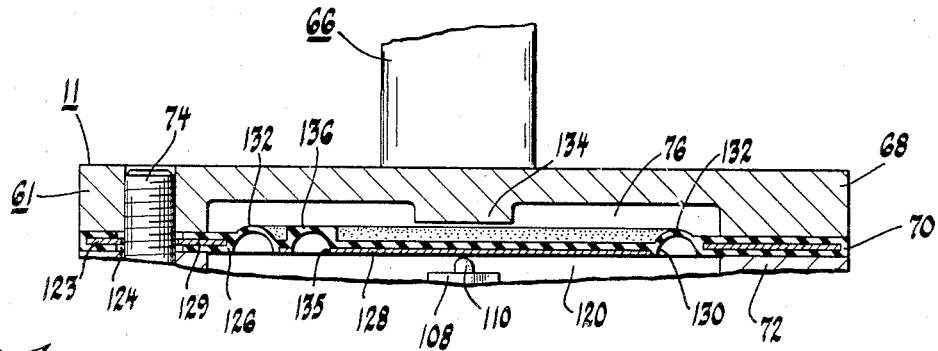
Figure 10 is a cross-sectional elevational view of the probe base and flexible diaphragm in the present invention along line 10—10 of Figure 6.

Figure 10 is a fragmentary cross-sectional view of the subject ice detector taken along line 10—10 of Figure 6 showing the recess structure of base plate 68 forming the annular chambers 76 on one side of the diaphragm 70 as outlined above. Figure 10 also shows a broken away portion of the cover plate 72 and the relay switch 108 with the plunger 110 protruding to a position adjacent a central portion of the diaphragm 70. The diaphragm 70 is provided with apertures 124 in a metallic insert 123, each of these apertures providing an opening for cap screws 74 used in securing the cover plate 72 with the probe base 68. A resilient coating, such as rubber or silicon rubber material, 126 is bonded securely in a uniform thickness over the metal insert 123. The metal insert 123 comprises a central disc 128 completely separated from an outer disc 129 in which the mounting bolt apertures 124 are provided. An annular space between disc 128 and ring 129 forms a gap 130 filled entirely by an annular crown or bulging portion 132 of the resilient material 126 providing flexibility for the disc 128 to be moved toward a central lug 134 extending downwardly into the recess 76 of base plate 68 or against the plunger 110 of the switch 108 located in the space 106. The metal disc 128 is on the side of the diaphragm engaging the plunger 110 so that the diaphragm will not easily wear out by repeated engagement of the diaphragm with the plunger 110. In addition to the annular crown portion 132, the diaphragm 70 is provided with three upwardly protruding resilient snubbing cups 136 formed having a flat upper edge with three evenly spaced apertures 135 provided in the disc 128. The purpose of the snubbers 136 is to provide a positive resilient stop for the diaphragm should air pressure force the disc 128 upwardly into chamber 76 engaging the downwardly extending portion 134. The three snubbers 136 are shown in Figure 6.

In operation, the screen 94 under certain atmospheric weather condition ices over as air strikes the mesh and blocks air flow providing one positive pressure on diaphragm 70 through the passage 100 to one side of the diaphragm, namely, chamber 106. When icing over occurs, the one positive pressure on diaphragm 70 in chamber 106 is cut off. However, the second positive pressure is not cut off because the aperture 84 of probe 66 is still open. The second positive air pressure is supplied through the cylindrical member 82 and aperture 80 to the recess or chamber 76 causing the diaphragm disc 128 to be pressed into engagement with plunger 110. This effects closing of the switch 108 energizing relay contacts in a manner similar to that described in conjunction with Figures 2 and 3 so as to provide a warning or icing indication to the pilot and/or energization of ice removal means and also to energize the heating unit 92 through the wire 114 and terminal or spring clip 118 engaging the electrical connection or rod 119 of the heating unit 92 adjacent the screen 94. The heating unit 92 then is energized by a circuit completed through the probe 66 and base 68 with cover 72 through screws 74 to terminal-mounting screw 109 and wire 112 to a source or battery connected thereto by prongs 62 of plug 60. Ice is melted away from the screen 94 until air pressure is restored through passageway 100 and aperture 102 to the chamber 106 on the switch side of the diaphragm 70. By providing a screen 94 having a fine mesh, the sensitivity of the probe 66 for the ice detector 10 can be appreciably increased so that even a thin coating of ice, which may prove dangerous in high speed aircraft due to heavy ice accumulations in a short period of time, will be quickly detected for alleviating or terminating the dangerous icing condition. Reference is made to the description of Figures 2 and 3 for the effect of actuation of ice detector switch 108 corresponding to switch 20 of Figures 2 and 3 in warning and ice removal using the circuits described.

The ice detecting means and control system of the present invention is advantageous in that protective thermal cutouts are eliminated by use of relays in the wiring circuits shown in Figures 2 and 3. Basing the operation of the ice detecting means on use of two positive pressures provides a sensing device properly operable as outlined at any speed or with any instantaneous condition of variable atmospheric conditions and pressures that may be encountered in aircraft. The small, lightweight construction is valuable for obvious reasons. The sensing of ice accumulation is quick and reliable.

While the embodiment of the present invention as herein disclosed constitutes a preferred form, it is to be understood that other forms might be adopted.

What is claimed is as follows:

1. An ice detector depending in operation upon balancing of two positive pneumatic pressures comprising in combination, a probe base having a pocket-forming recess on one side thereof, a probe having dual inlet apertures and providing a pair of air inlet passages communicating with apertures in said base, a cover plate formed with recesses therein complementary to the recess of said probe base, a diaphragm assembled between said base and said cover plate with the recesses thereof forming air chambers on opposite sides of said diaphragm, each of the chambers communicating through the apertures of said base with the air inlet passages of said probe, a screen attached to said probe to cover one of the inlet apertures therein, a heating element mounted in said probe adjacent said screen and having an end protruding from said probe through one aperture of said probe base, a switch disposed in a recess of said cover plate and having a plunger operable by movement of said diaphragm to effect energization of said heating element upon unbalance of pneumatic pressures in the chambers due to icing over of said screen closing off the air inlet passage to the air chamber on one side thereof, each of the dual inlet apertures of said probe being located in a region where each is highly susceptible to ice accretion.

2. A device for indicating accretion of ice thereon in an air stream, comprising, a case, said case including a probe base having a pocket-forming recess, a probe protruding from said base and including a pair of coaxially spaced cylindrical members each having air intake apertures in a leading airfoil edge thereof and a bleed hole for each air intake aperture, a disc having an off-center aperture attached between said cylindrical members, a heating unit axially disposed in said members spaced off-center thereof through the aperture of said disc and an aperture in said base, a trailing edge airfoil portion radially attached along spaced longitudinal edges of the assembled disc and cylindrical members, a teardrop-shaped disc covering the end of one of said cylindrical members and said trailing edge airfoil portion, a screen attached to one of said cylindrical members covering the intake aperture thereof, said heating unit being located adjacent said screen and being capable of melting aperture-closing ice accumulation, a diaphragm having a side aperture located axially below said probe, a cover plate having pocket-forming recess structure and connectible to said probe base with said diaphragm therebetween completing air pocket chambers on opposite sides of said diaphragm, said probe providing a first air-inlet passage to one of the air pocket chambers through said screen over the one aperture to a diametrically opposite aperture partially surrounding said heating unit and continuing between said trailing edge airfoil portion through an aperture in said base leading from said trailing edge portion through the aperture of said diaphragm to the air pocket chamber on one side of said diaphragm, said probe providing a second air-inlet passage to another side of said diaphragm through an aperture of one of said cylindrical members and continuing separated by said apertured disc between said members from the first passage through an aperture of said base leading from said cylindrical member to the air pocket chamber on the one side of said diaphragm, and snap-acting switch means operable by one air pressure on one side of said diaphragm to energize said heating unit whenever screen icing cuts off the second air pressure on the opposite side of said diaphragm.

3. An ice detecting means dependent in operation upon balancing of two positive pneumatic pressure comprising a probe exposed to an air stream and having a recessed base portion at one end divided into a pair of chambers, said probe having a pair of openings of which one is uncovered and each is located in a region highly susceptible to ice accretion, restricting means provided with said probe at one opening thereof, electrical heating means with said probe adjacent the pair of openings and energizable to melt ice away from the openings, a normally-open pressure actuated switch means mounted within said recessed base portion, said switch means closing in response to one positive pressure in one chamber upon icing over of said restricting means cutting off the second positive pressure in the other chamber, and circuit means interconnecting said switch means and said electrical heating means, said probe having an airfoil cross section with leading and trailing edges relative to the air stream and with the openings and restricting means all in the leading edge of said probe.

4. An ice detecting means dependent in operation upon balancing of two positive pneumatic pressures comprising a probe exposed to an air stream, said probe having a pair of openings located in a region highly susceptible to ice accretion, electrical heating means with said probe adjacent the pair of openings and energizable to melt ice therefrom, a normally-open pressure actuated switch means located with said probe and being subject to differential pressure from air channeled adjacent thereto from the pair of openings of said probe, said switch means closing in response to one positive pressure upon icing over of one of the probe openings cutting off the second positive pressure, and circuit means interconnecting said switch means and said electrical heating means, said probe having an air foil cross section with leading and trailing edges relative to the air stream and with the openings all in the leading edge of said probe.

5. In the ice detecting means of claim 4, a restricting means for one of the pair of openings in the leading edge of said probe formed by a plurality of small holes provided in a cluster adjacent to each other, the cluster extending longitudinally as well as laterally and arcuately in a region of the leading edge of the probe where said restricting means is highly susceptible to ice accretion.

6. In the ice detecting means of claim 4, a restricting means for one of the pair of openings in the leading edge of said probe, including, a screen having closely inter-woven strands forming a plurality of small holes provided in a cluster adjacent to each other, said screen being located to form the cluster of holes in a region extending longitudinally as well as arcuately and laterally of the leading edge of the probe where said restricting means is highly susceptible to ice accretion, the other of said pair of openings being unrestricted.

7. In an ice detecting means dependent in operation upon balancing of two positive pneumatic pressures, a probe exposed to an air stream, comprising, means forming a body portion and a base portion for said probe, said body portion having an air foil cross section with leading and trailing edges relative to an air stream, said leading edge having a pair of openings located in a region highly susceptible to ice accretion, electrical heating means within said probe body portion adjacent to the pair of openings and energizable to melt ice therefrom, a diaphragm located in a space inside said base portion and dividing the space into separate pressure chambers connected by passages thereto from the openings of said probe, a normally-open pressure actuated switch means located in one pressure chamber adjacent to and capable of being actuated by movement of said diaphragm due to differential pressure of air in the separate chambers when one of the probe openings becomes iced over to cut off air supply thereto, circuit means interconnecting said switch means and said electrical heating means, and a restricting means for one of the pair of openings in the leading edge of said probe formed by a plurality of small holes provided in a cluster adjacent to each other, the cluster extending longitudinally as well as laterally and arcuately in the region of the leading edges of said probe where said restricting means is highly susceptible to ice accretion, the other of said pair of openings in the leading edge of said probe being unrestricted, said probe having bleed passages formed extending laterally of and being immediately adjacent to the pair of openings in the leading edge of said probe body portion.

8. In the ice detecting means of claim 4, a restricting means for one of the pair of openings in the leading edge of said probe formed by a plurality of small holes provided in a cluster adjacent to each other, the cluster extending longitudinally in a region of the leading edge of the probe where said restricting means is highly susceptible to ice accretion.

References Cited in the file of this patent

UNITED STATES PATENTS

| 2,541,512 | Hahn | Feb. 13, 1951 |
| 2,670,912 | Lindsey | Mar. 2, 1954 |
| 2,724,106 | Fraser | Nov. 15, 1955 |
| 2,739,302 | Timbie | Mar. 20, 1956 |
| 2,744,992 | Spears | May 8, 1956 |
| 2,775,678 | Flubacker | Dec. 25, 1956 |

FOREIGN PATENTS

| 446,983 | Great Britain | May 11, 1936 |